(12) United States Patent
Hayton

(10) Patent No.: US 11,232,190 B2
(45) Date of Patent: Jan. 25, 2022

(54) DEVICE ATTESTATION TECHNIQUES

(71) Applicant: Trustonic Limited, Cambridge (GB)

(72) Inventor: Richard Hayton, Cambridge (GB)

(73) Assignee: Trustonic Limited, Cambridge (GB)

( * ) Notice: Subject to any disclaimer, the term of this patent is extended or adjusted under 35 U.S.C. 154(b) by 187 days.

(21) Appl. No.: 16/592,971

(22) Filed: Oct. 4, 2019

(65) Prior Publication Data

US 2020/0143031 A1    May 7, 2020

(30) Foreign Application Priority Data

Nov. 1, 2018  (GB) ..................................... 1817901

(51) Int. Cl.
*G06F 21/44*       (2013.01)
*G06F 21/60*       (2013.01)
*G06F 21/62*       (2013.01)
*H04L 9/32*        (2006.01)

(52) U.S. Cl.
CPC ............. *G06F 21/44* (2013.01); *G06F 21/602* (2013.01); *G06F 21/6245* (2013.01); *H04L 9/3236* (2013.01)

(58) Field of Classification Search
CPC .... G06F 21/44; G06F 21/602; G06F 21/6245; G06F 21/73; G06F 21/57; G06F 21/46; G06F 21/6218; G06F 21/64; H04L 9/3236; H04L 2209/805; H04L 9/3239; H04W 12/06
USPC ....................................................... 713/168
See application file for complete search history.

(56) References Cited

U.S. PATENT DOCUMENTS

| | | | | |
|---|---|---|---|---|
| 8,225,110 | B2* | 7/2012 | Stahl | G06F 21/10 |
| | | | | 713/193 |
| 8,854,115 | B2* | 10/2014 | Merchant | G06F 21/73 |
| | | | | 327/525 |
| 9,411,962 | B2* | 8/2016 | Attfield | H04W 12/10 |
| 9,680,872 | B1* | 6/2017 | Roth | G06F 21/57 |
| 10,536,271 | B1* | 1/2020 | Mensch | H04L 9/0861 |
| 10,546,130 | B1* | 1/2020 | Chaney | G06F 21/725 |
| 2006/0005009 | A1* | 1/2006 | Ball | G06F 21/57 |
| | | | | 713/155 |
| 2007/0061872 | A1* | 3/2007 | Carter | H04L 63/102 |
| | | | | 726/4 |
| 2008/0046752 | A1* | 2/2008 | Berger | H04L 63/0823 |
| | | | | 713/186 |

(Continued)

FOREIGN PATENT DOCUMENTS

EP      3 346 415      7/2018

OTHER PUBLICATIONS

Combined Search and Examination Report for GB1817901.0 dated Apr. 10, 2019, 7 pages.

*Primary Examiner* — Shahriar Zarrineh
(74) *Attorney, Agent, or Firm* — Nixon & Vanderhye P.C.

(57) ABSTRACT

A method for providing an attestation for enabling a device to attest to an assertion concerning the device, comprising: generating an attestation identifier and a base-secret code corresponding to the attestation identifier; providing the attestation identifier and a validation-secret code to a validation apparatus for storage in conjunction with the assertion, wherein the validation-secret code is based on the base-secret code; providing the attestation identifier and a device-secret code to a manufacturer or adapter for provision to a device, wherein the device-secret code is based on the base-secret code.

15 Claims, 6 Drawing Sheets

(56) References Cited

U.S. PATENT DOCUMENTS

| | | | |
|---|---|---|---|
| 2009/0193509 A1* | 7/2009 | Cardone | H04L 63/0414 726/9 |
| 2011/0087887 A1* | 4/2011 | Luft | H04L 9/3247 713/178 |
| 2012/0216244 A1* | 8/2012 | Kumar | G06F 21/57 726/1 |
| 2013/0145153 A1* | 6/2013 | Brown | H04L 63/0823 713/156 |
| 2013/0151846 A1* | 6/2013 | Baumann | H04L 9/3263 713/156 |
| 2013/0212369 A1* | 8/2013 | Imtiaz | G06F 21/575 713/2 |
| 2014/0281500 A1* | 9/2014 | Ignatchenko | G06F 21/53 713/156 |
| 2014/0283098 A1* | 9/2014 | Phegade | H04L 63/0428 726/26 |
| 2014/0289833 A1* | 9/2014 | Briceno | H04L 63/08 726/7 |
| 2016/0006735 A1* | 1/2016 | La Fever | H04L 63/0435 713/171 |
| 2016/0072626 A1 | 3/2016 | Kouladjie | |
| 2017/0180314 A1* | 6/2017 | Walker | H04L 9/083 |
| 2017/0316390 A1 | 11/2017 | Smith et al. | |
| 2017/0317833 A1* | 11/2017 | Smith | H04L 9/3066 |
| 2018/0114000 A1* | 4/2018 | Taylor | H04L 9/3247 |
| 2018/0198604 A1* | 7/2018 | Hayton | H04W 12/10 |
| 2018/0367310 A1* | 12/2018 | Leong | H04L 9/0861 |
| 2018/0373863 A1* | 12/2018 | Domke | H04L 9/3236 |
| 2019/0020647 A1* | 1/2019 | Sinha | G06F 21/57 |
| 2019/0074981 A1* | 3/2019 | Loreskar | H04L 9/0861 |
| 2019/0102555 A1* | 4/2019 | Novak | H04L 9/3268 |
| 2019/0114431 A1* | 4/2019 | Cheng | G06F 21/575 |
| 2019/0149539 A1* | 5/2019 | Scruby | H04L 9/321 713/168 |
| 2019/0207953 A1* | 7/2019 | Klawe | G07F 7/088 |
| 2019/0319807 A1* | 10/2019 | Fairfax | G06F 21/57 |
| 2020/0045020 A1* | 2/2020 | Soundararajan | H04L 9/006 |
| 2020/0259668 A1* | 8/2020 | Loreskar | H04L 63/064 |
| 2020/0287890 A1* | 9/2020 | Edgington | H04L 63/0823 |

* cited by examiner

| Attestation Identifier | Validation-Secret Code | Assertion | Additional Field 1 | Additional Field 2 |
|---|---|---|---|---|
| 1001 | AB47EF89 | Device Property 1 | ......... | ......... |
| 1002 | 749DABE6 | Event 1 | ......... | ......... |
| 1003 | BF56DEF0 | Quality Assurance 1 | ......... | ......... |

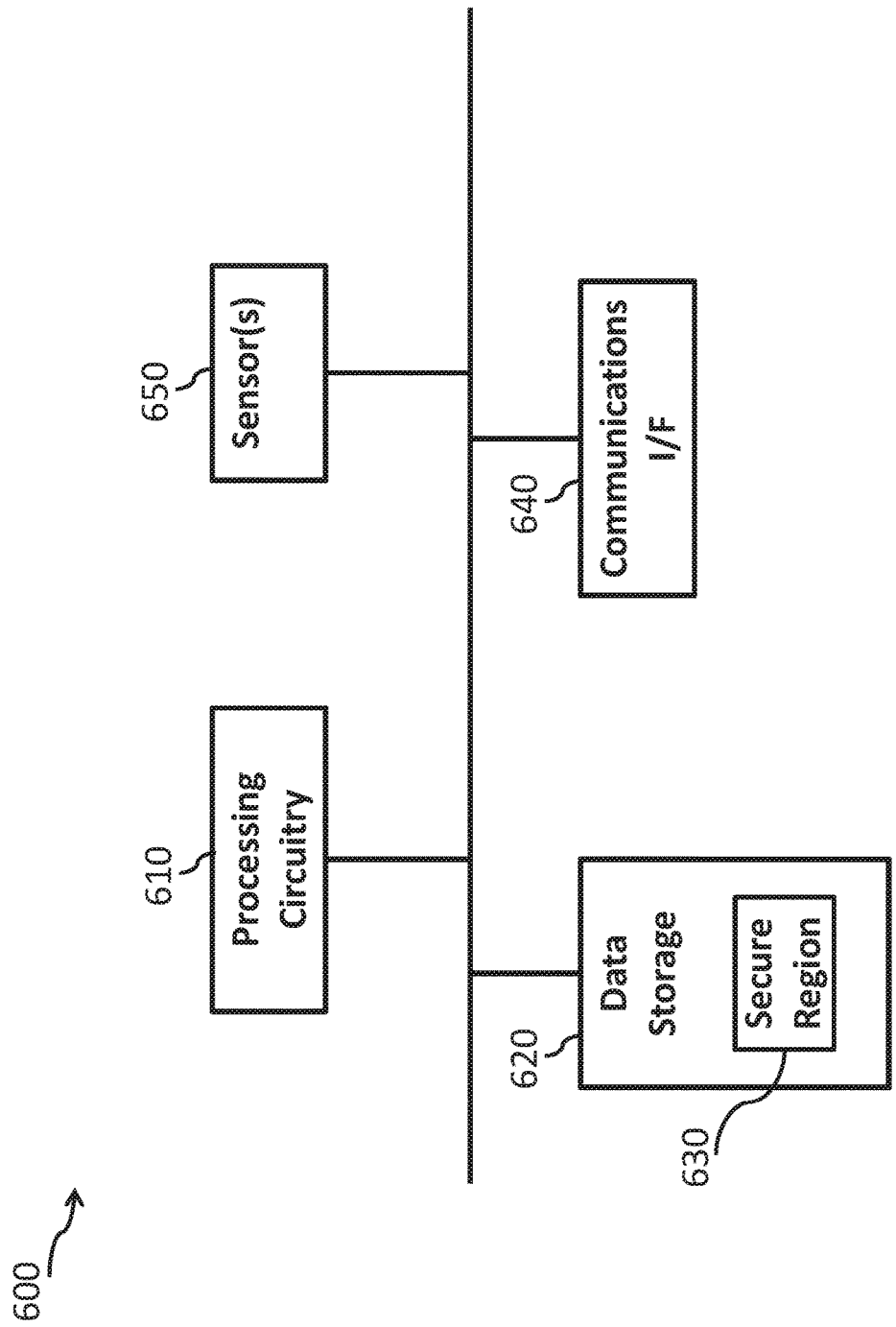

DEVICE ATTESTATION TECHNIQUES

This application claims priority to GB Patent Application No. 1817901.0 filed Nov. 1, 2018, the entire contents of which are hereby incorporated by reference.

FIELD AND BACKGROUND

The present techniques relate to the field of electronic devices. More particularly, they relate to providing an attestation for enabling a device to attest to an assertion concerning the device.

Increasingly, electronic devices are being used to access services which may involve handling of potentially sensitive information, such as mobile banking, access to health care services or handling of employment details. Also, with the increasing development of the Internet of Things (IoT), it is becoming more common for systems such as heating, air-conditioning or street lighting to be controlled based on information provided by electronic devices which may provide sensor information such as temperature data or proximity information indicating whether a user is present, for example. In these scenarios, it can be important for a service provider to be able to verify that the electronic device meets certain requirements in order to trust that interactions with the electronic device are secure. The service provider may need to have confidence that certain events have occurred during the manufacturing process used to manufacture the electronic device or in subsequent adaptations of the device during its lifecycle. For example, such events could include a system-on-chip being embedded into a component by a device manufacturer, a device passing through a certain quality assurance step, or some specific software being provisioned on the device.

Cryptographic techniques can be provided which store detailed attestation information on the device which allow an external entity to verify that such events have occurred. However, such techniques typically require the storage of a large quantity of information on the device itself. In very small computing devices such as sensors, actuators or other devices in the IoT, memory storage capacity, processing power and communication bandwidth can be extremely constrained hence making such approaches infeasible. Furthermore, the storage of such information on the device may allow for the possibility for the information to be extracted and duplicated to another device to create a "forged" device which could falsely attest that the forged device has undergone the attested to events.

At least certain embodiments of the present disclosure address one of more of these problems as set out above.

SUMMARY

Particular aspects and embodiments are set out in the appended claims.

Viewed from one perspective, there can be provided a method for providing an attestation for enabling a device to attest to an assertion concerning the device, comprising: generating an attestation identifier and a base-secret code corresponding to the attestation identifier; providing the attestation identifier and a validation-secret code to a validation apparatus for storage in conjunction with the assertion, wherein the validation-secret code is based on the base-secret code; providing the attestation identifier and a device-secret code to a manufacturer or adapter for provision to a device, wherein the device-secret code is based on the base-secret code.

The provision of different secret codes to different entities mitigates the risk that a secret code could be extracted from one entity and used to create a forged version of another entity. For example, extracting the validation-secret code from the validation apparatus may not allow determination of what device-secret code was provide to the manufacturer or adapter hence mitigating the impact of data theft from the validation apparatus. In addition, the present approach allows for the assertion itself to be stored remote from the device hence saving storage space on the device. In some examples, the attestation identifier is generated using an attestation generator. The attestation generator may be a physically separate device from the validation apparatus or both the attestation generator and validation apparatus may be located in the same physical device. In some examples, the attestation generator generates the device-secret code and/or the validation-secret code.

In some examples, the attestation identifier and the device-secret code are provided by the manufacturer or adapter to the device. Thereby, thereby the device-secret code is distributed to the device under the control of the manufacturer or adapter. Thus, this distribution can be done without the direct involvement of, or provision of information about the distribution to, the validation apparatus or the device which generates the attestation identifier and base-secret code (e.g. an attestation generator).

In some examples, the device-secret code is the same as the base-secret code. Thereby, the need for additional processing to generate the device-secret code can be avoided.

In some examples, the base-secret code is not provided to the validation apparatus. Thereby, as the validation apparatus does not have access to the base-secret code, a theft of information from the validation apparatus would not allow a malicious entity to generate the device-secret code (which is based on the base-secret code) and hence the information could not be used to create a forged device.

In some examples, the validation-secret code is generated by hashing the base-secret code using a first predetermined hash function. Thereby, by generating the validation-secret code through the use of a one-way function (e.g. a hash function), it is in general not possible to reverse the hash function to generate the base-secret code from the validation-secret code. In some examples, this generation of the validation-secret code is carried out by an attestation generator prior to provision of the validation-secret code to the validation apparatus. In other examples, the base-secret code is provided to the attestation generator and the attestation generator generates the validation-secret code itself.

In some examples, the device-secret code is the same as the base-secret code, and in response to provision of the attestation identifier and the device-secret code to the device, the device hashes the device-secret code using the first predetermined hash function to generate the validation-secret code. Thereby, through the generation of a derivative secret code (the validation-secret code) through the use of a one-way function (e.g. a hash function) on the device, the base-secret/device-secret code need to not be stored on the device and hence a theft of information from the device would not allow a malicious party to provide the base-secret/device-secret code to a second device and hence create a forged device.

In some examples, the device further hashes the validation-secret code in combination with one or more items of locally available information using a second predetermined hash function to generate a hashed-value. Thereby, the device generates a further derivative secret code (hashed-value) which can only be generated using the locally available information. This therefore means that the hashed-value can only be generated by devices which have access to the device's locally available information hence limiting the devices which can generate the hashed value. For the purposes of validation (e.g. at a validation apparatus) the validating entity need only have access to the locally available information at the time of validation. In other words the device can keep the locally available information private up to this point. Furthermore, it means that the device need not store the validation-secret code and hence a theft of information from the device would not allow for the validation of attestations regarding the device.

In some examples, the first predetermined hash function and second predetermined hash function use the same computational function but operate on different data inputs. Thereby, only a single computational hashing function need be stored on the device thus saving space and, in general, allowing for further hardware/software optimisation of the performance of the hashing function.

In some examples, when the attestation identifier and device-secret code are the initial attestation identifier and initial device-secret code provided to the device the one or more items of locally available information comprise a device identifier, and when the attestation identifier and device-secret code are not the initial attestation identifier and initial device-secret code provided to the device the one or more items of locally stored information comprise a previous hashed-value.

Thereby, the use of the second predetermined hash function on the initial attestation identifier/device-secret code generates a hashed-value tied to the device itself by using the identifier of the device. Further, by using a previous hashed-value when using the second predetermined hash function on attestation identifiers/device-secret codes subsequent to the initial attestation identifier/device-secret code, the generated further hashed-value will be based in part on previous hashed-value(s).

Thereby, the further hashed-value acts as a "digest" of all previous hashed-values input directly or indirectly (i.e. where the second predetermined hash function has been iteratively applied to a chain of previous hashed-values corresponding to a plurality of previous attestation identifiers and device-secret codes). As such, the "digest" can be used in validating the attestations corresponding to all the attestation identifiers/device-secret codes which went into making it, without the requirement to store all intermediated hashed-values on the device.

In some examples, the previous hashed-value is the most recent previous hashed-value. Thereby, the second predetermined hash function is iteratively applied to all previous hashed-values and hence the final hashed-value can be used in validating the attestations corresponding to all the attestation identifiers/device-secret codes which have been received by the device.

In some examples, after generation of the hashed-value the device stores the hashed-value but does not store the device-secret code or validation-secret code. Thereby, even if malicious party gains access to the information stored on the device, the information stolen would not allow the malicious party to create a forged device or to validate attestations concerning the device.

In some examples, the device only stores the most recent hashed-value. As the most recent hashed-value can act as a "digest" of all previous hashed-values, the storage of the most recent hashed-value is sufficient to validate the attestations corresponding to each of the previous hashed-values without the need to consume storage on the device by storing the previous hashed-values themselves.

In some examples, the device further hashes the validation-secret code in combination with the attestation identifier to generate the hashed-value. Thereby, by including more elements as inputs to the hash, security is enhanced by making the hash harder to reverse.

In some examples, after generation of the hashed-value the device stores the attestation identifier. Thereby, the device can itself directly provide the information which identifies which attestation(s) the hashed-value corresponds to and which in certain examples is necessary to validate the attestation(s).

In some examples, the one or more items of locally available information further comprise metadata. Thereby, security can be enhanced by the inclusion of more elements as inputs to the hash thus making the hash further harder to reverse. Furthermore, the metadata can establish that specific information (e.g. information about the internal status of the device, an information payload, information received by the device from external sources) was available to the device at the time the hashed-value was generated. In some examples, the metadata may include some or all of the code present on the device and one or more public keys stored on the device. Additionally or alternatively, the metadata may include information related to the state of the device software (e.g. software name, version, hash/public key used to sign the software), time/date that the hashed-value was generated, the human/machine operation(s) involved, or the geographic location where the operation took(s) place.

In some examples, after generation of the hashed-value the device stores the metadata. Thereby, the device can itself directly provide the metadata which in certain examples is necessary to validate the attestation(s).

Viewed from one perspective, there can be provided a method for a validation apparatus to validate an attestation from a device attesting to an assertion concerning the device, comprising: obtaining from an attestation database one or more entries, each entry comprising an attestation identifier, a validation-secret code and an assertion; obtaining from the device one or more attestation identifiers and a hashed-value; performing a validation operation on the one or more attestation identifiers obtained from the device together with the corresponding validation-secret codes obtained from the attestation database to validate the hashed-value obtained from the device; determining whether the one or more assertions associated with the one or more attestation identifiers obtained from the device are valid in respect of the device in dependence on a validation result of the validation operation. In other words, in some examples, the device simply provides one or more attestation identifiers and a hashed-value to the validation apparatus but does not providing the assertion itself (i.e. the actual semantic meaning of the attestation) which is retrieved from a separate attestation database. It is also explicitly contemplated, that in certain examples the assertion may additionally or alternatively be stored on the device itself.

By obtaining attestation identifiers from both the attestation database and device the hashed-value from the device can be matched up with the validation-secret code and the attestation received from the attestation device, the validation apparatus is able to validate whether various attestations in respect of the device are correct without the need for the device itself to store the validation-secret code or the assertion hence saving space. This furthermore, reduces the risk of theft of information form either the device or attestation database as neither entity stores information which alone or in combination would allow a forged device to be created. Yet further, in order to validate an attestation, information from both the device and attestation database would have to be obtained. In some examples, the attestation database is located on the same physical device and/or is part of the validation apparatus. In other examples, the attestation database is located on a separate physical device from the validation apparatus.

In some examples, a device identifier is further obtained from the device, and wherein the validation operation is further performed on the device identifier. Thereby, it can be determined that the assertions are valid specifically in respect of a particular device identifier where, in general, at least the manufacturer/adapter is aware of which physical device the device identifier belongs to.

In some examples, metadata is further obtained from the device, and wherein the validation operation is further performed on the metadata. Thereby, as part of the validation process, the validation apparatus can prove that the metadata was known at the time the hashed-value was generated. Additionally or alternatively, metadata may be obtained from the device to prove that the metadata was known at the time that the attempt to validate the attestation form the device was made.

In some examples, the validation operation comprises at least one hash function per attestation identifier obtained from the device and wherein each hash function iteratively acts on the result of the previous hash function with each successive hash function taking as an input at least an attestation identifier not previously used as an input in the previous hash functions. Thereby, a plurality of attestations can be validated to have been generated in a specific sequence as the result of the hash functions being computational dependent upon each other by virtue of taking the result(s) of the previous hash function(s).

In some examples, a plurality of attestation identifiers are obtained from the device and only one hashed-value corresponding to the most recent hashed-value is obtained from the device, and it is determined whether all or none of the plurality of assertions associated with the plurality of attestation identifiers obtained from the device are valid in respect of the device in dependence on the validation result by the validation operation. Thereby, a plurality of assertions may be validated with only having to receive a single hashed-value from the device thus saving communication bandwidth and the need for the device to store more than the single most recent hashed-value.

In some examples, a plurality of attestation identifiers are obtained from the device and a plurality of hashed-values are obtained from the device, and the validation operation comprises a plurality of validation operations whereby it is determined whether subsets of the plurality of assertions associated with the plurality of attestation identifiers obtained from the device are valid in dependence on the validation results of the plurality of validation operations. Thereby, by receiving a plurality hashed-values, the validation apparatus is able to separately validate subsets of assertions so, in the event of a negative validation, it is possible to at least partially identify which specific subset of assertion(s) are false. Thus, for example, it may be possible to narrow down the source of the false assertions (e.g. to a particularly interacting device or entity). For example, in some examples, a hashed-value may be obtained for every two, three or four, attestation identifiers.

In some examples, the validation apparatus obtains from the attestation database a plurality of validation-secret codes and assertions in association with a particular attestation identifier, and when the particular attestation identifier is obtained from the device the validation operation is attempted with each of the possible validation-secret codes. Thereby, thorough the use of non-unique attestation identifiers, shorter attestation identifiers may be used (hence saving storage space on the device) while still allowing for the attestation to be validated in a reasonable time. For example, if there are three validation-secret codes and three assertions for each attestation identifier, at worst the validation operation needs to be attempted three times to determine which if any assertions are valid. If, however, the first assertion tested is shown to be valid, in some examples, the validation operations would not check the second and third assertions.

Viewed from one perspective, there can be provided a method for a device to store information on the device enabling the device to attest to an assertion concerning the device, comprising: receiving, at the device, a base-secret code and a corresponding attestation identifier; hashing, at the device and using a first predetermined hash function, the base-secret code to generate a validation-secret code; hashing, at the device and using a second predetermined hash function, the validation-secret code in combination with one or more items of locally available information using a second predetermined hash function to generate a hashed-value; wherein after generation of the hashed-value the device stores the hashed-value.

By performing two hashes at the device to generate a hashed-value which is stored, the device does not need to store either the base-secret code or validation-secret code. This thereby allows the device to save space but also be resistant to replication, since if the hashed-value is stolen from the device (e.g. because only the hashed-value is stored on the device) a forged device cannot be created. A forgery cannot be created since the base-secret code cannot, in general, be recreated from the hashed-value as the two hashing operations performed by the device are one-way operations, and therefore the base-secret code cannot be provided to a second device to create a forgery.

Viewed from one perspective, there can be provided a computer program for controlling a device to perform any of the above-described methods. In some examples, the computer program is stored on a storage medium.

Viewed from one perspective, there can be provided an apparatus comprising: processing circuitry to perform data processing; and data storage storing a computer program for controlling the processing circuitry to perform any of the above-described methods.

Other aspects will also become apparent upon review of the present disclosure, in particular upon review of the Brief Description of the Drawings, Detailed Description and Claims sections.

BRIEF DESCRIPTION OF THE DRAWINGS

Examples of the disclosure will now be described, by way of example only, with reference to the accompanying drawings in which:

FIG. 6: Schematically illustrates an example of an electronic device.

Figure 1:
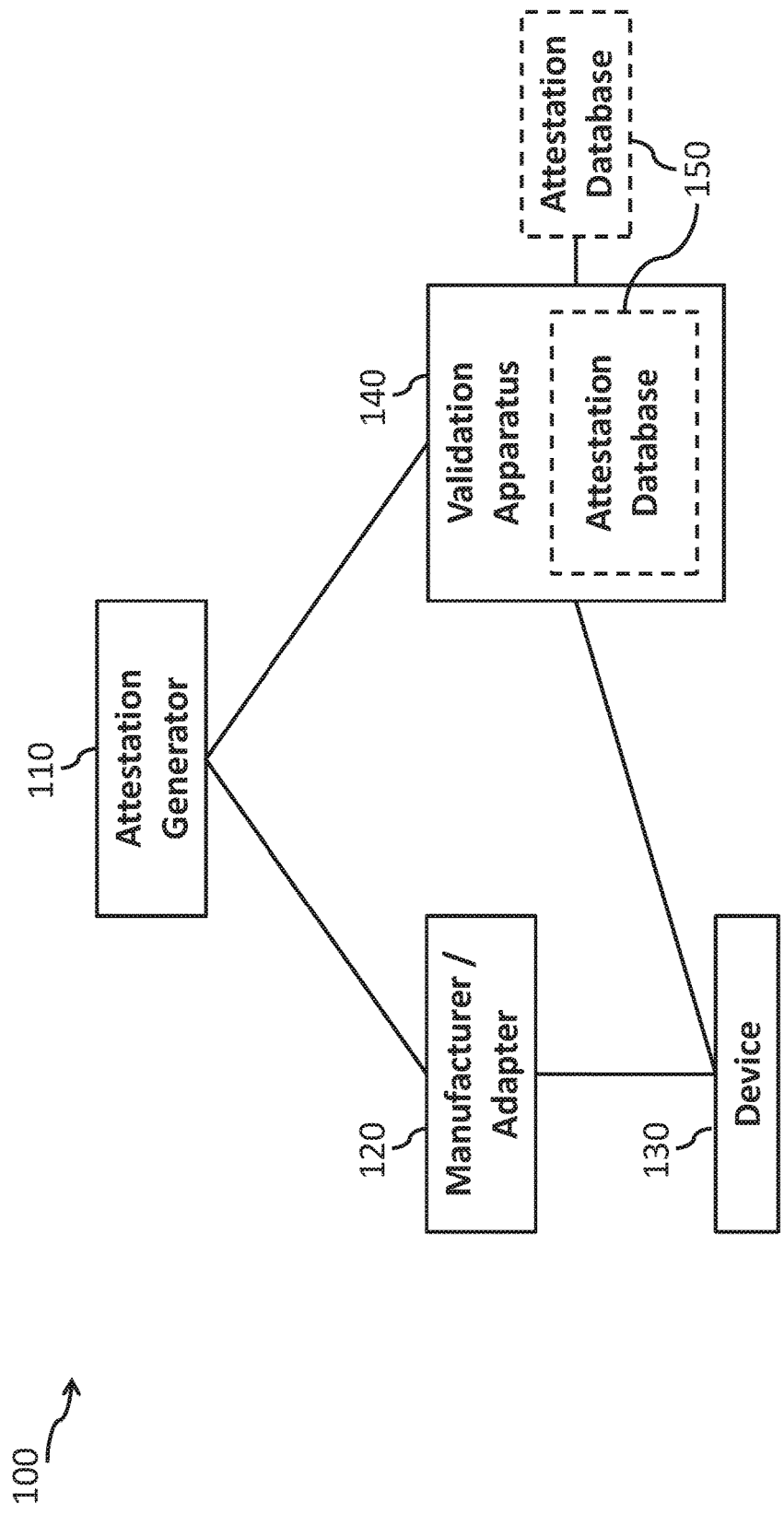
FIG. 1: Schematically illustrates an example system for implementing examples of the disclosure.

While the disclosure is susceptible to various modifications and alternative forms, specific example approaches are shown by way of example in the drawings and are herein described in detail. It should be understood however that the drawings and detailed description attached hereto are not intended to limit the disclosure to the particular form disclosed but rather the disclosure is to cover all modifications, equivalents and alternatives falling within the spirit and scope of the claimed invention.

It will be recognised that the features of the above-described examples of the disclosure can conveniently and interchangeably be used in any suitable combination.

DETAILED DESCRIPTION

FIG. 1 shows a schematic illustration of a system 100 for implementing examples of the disclosure. The system comprises an attestation generator 110, a manufacturer/adapter 120, a device 130, validation apparatus 140 and an attestation database 150. Each of these elements can be implemented using an electronic device as set out in FIG. 6 and its corresponding description below.

Also shown on FIG. 1 are a number of example linkages between the various elements. These linkages represent communication channels between the elements. These communication channels may be implemented using a wired electrical connection (e.g. Ethernet), using a wired optical connection (e.g. a fibre optic cable), a wireless radio connection (e.g. Wi-Fi®, Bluetooth®, ZigBee®) or using any other suitable technology which allows the elements to communicate data.

While a number of principle linkages have been shown, in certain examples other linkages may also be present. For example, the manufacturer/adapter 120 may have a direct link to the attestation database 150, or the attestation generator 110 may be directly linked to the device 130. It will also be appreciated that in certain examples not all of the linkages shown may be present. For example, the linkage between the device 130 and validation apparatus 140 may not be present and instead the device 130 may communicate with the validation apparatus 140 via the manufacturer/adapter 120 and the attestation generator 110.

It will also be appreciated that in certain examples not all linkages may be permanent and instead may be transitory or periodic. For example, the manufacturer/adapter 120 may only be connected to the device 130 during manufacture or adaptation and as another example the connection between the device 130 and validation apparatus 140 may only be available specifically while the device is being validated.

The attestation generator 110 is responsible for the generation of attestation identifier(s) and corresponding base-secret code(s). In certain examples, the attestation generator is a centralised server controlled by a first party that is in overall control of the attestation process.

The manufacturer/adapter 120 is the entity responsible for provision of attestation identifier(s) and corresponding base-secret code(s) to the device 130. In certain examples, the manufacturer/adapter 120 corresponds to manufacturing, assembly or adaptation equipment controlled by a second party which is, at least in part, responsible for producing the finished device 130.

The device 130 is the entity about which attestations to assertions concerning the device are being made. In certain examples, the device corresponds to an Internet of Things (IoT) device. Such IoT devices are typically very small computing devices such as sensors, actuators or other devices in the IoT, for which memory storage capacity, processing power and communication bandwidth can be extremely constrained.

The validation apparatus 140 is the entity which acts to validate whether assertions concerning the device are valid. In certain examples, the validation apparatus is a server controlled by the first party (i.e. the same party as the attestation generator). In certain examples, the validation apparatus is a cloud hosted web service.

The attestation database 150, is the entity which stores information linking the attestation identifiers with assertions together with a secret code used in validating assertions regarding the device. In certain examples, the attestation database is located on the same physical device and/or is part of the validation apparatus. In other examples, the attestation database is located on a separate physical device from the validation apparatus and connected by a communication channel (linkage).

In addition to the choice of location of the attestation database other of the elements may be combined. In certain examples, the elements may be implemented as software or hardware modules of a larger entity. For example, the attestation generator 110 and validation apparatus 140 may be located on the same physical/logical device. As another example, the manufacturer/adapter 120 and validation apparatus 140 may be located on the same physical/logical device.

It will also be appreciated, that the system 100 may include a plurality of various of the elements. For example, the system 100 may act on a plurality of devices 130 such that each can have assertions in respect of itself validated. As another example, the system 100 may include a plurality of manufacturers/adapters 120 which may all act on a single device 130 or may each act on different devices 130.

Figure 2:
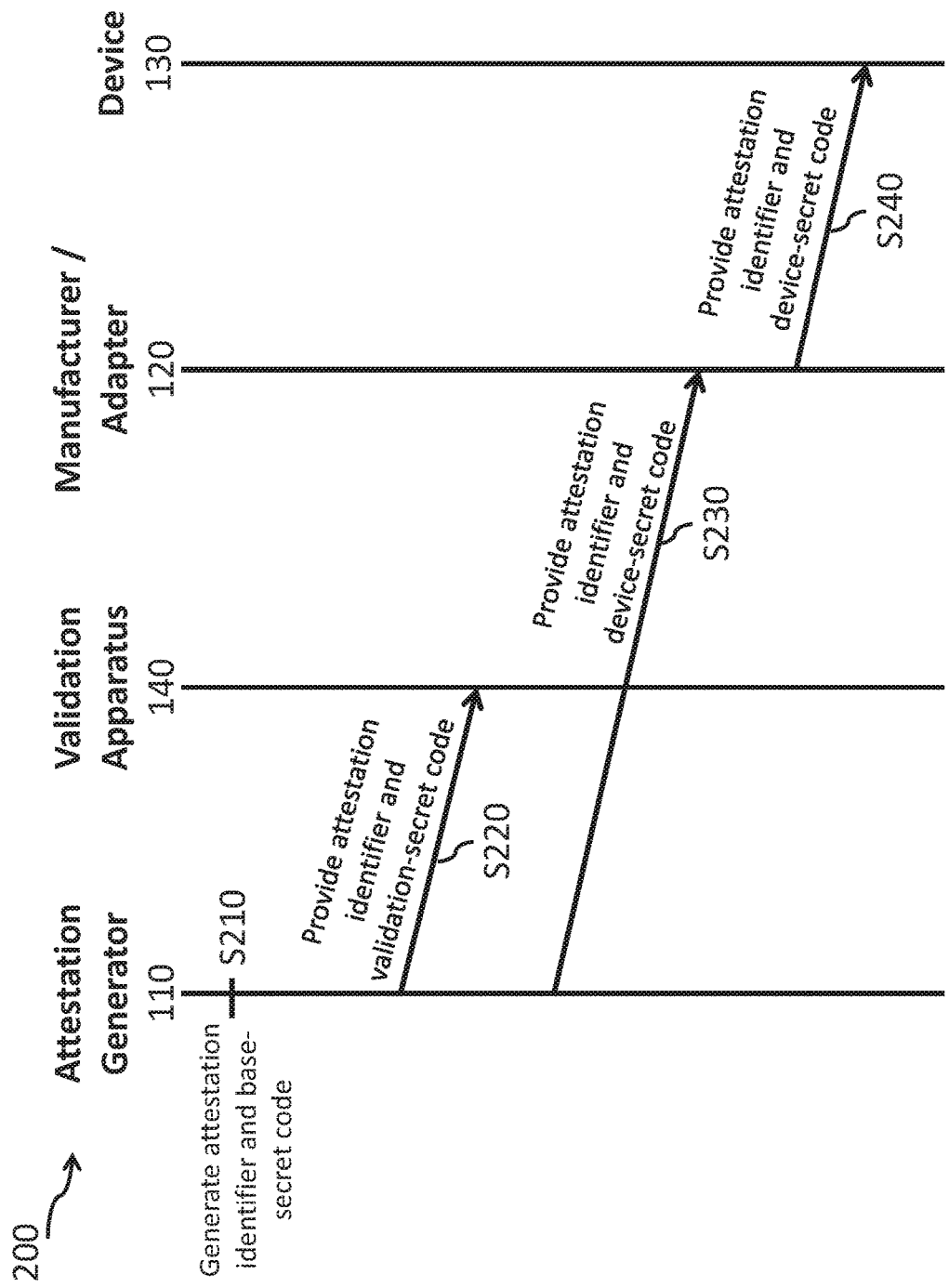
FIG. 2: Schematically illustrates a method for providing an attestation for enabling a device to attest to an assertion concerning the device.

FIG. 2 shows a schematic illustration of a method 200 for providing an attestation for enabling a device 130 to attest to an assertion concerning the device 130 which includes the following steps.

At step S210, an attestation identifier and a base-secret code corresponding to the attestation identifier are generated. In a particular example, the generation is performed by the attestation generator 110.

At step S220, the attestation identifier and a validation-secret code are provided to the validation apparatus 140, the validation-secret code being based on the base-secret code. In the particular example, the attestation identifier and a validation-secret code are provided by the attestation generator 110. In certain examples, the base-secret code is not provided to the validation apparatus 140.

In certain examples, the validation-secret code is generated by hashing the base-secret code using a first predetermined hash function. The first predetermined hash function may be a cryptographic hashing function to further enhance security of the "one-way" function. Examples of suitable hashing algorithms include MD5, the family of SHA (e.g. SHA-256) or any other suitable hashing algorithm. It is also explicitly contemplated that in some examples the first predetermined hash function may be a non-cryptographic hashing function such as a cyclic redundancy check. In certain examples, the validation-secret code is generated at the attestation generator 110 and sent to the validation apparatus 140 such that the validation apparatus 140 never has access to the base-secret code. In other examples, the base-secret code is sent to the validation apparatus 140 which performs the hash using the first hashing algorithm to arrive at the validation-secret code.

At step S230, the attestation identifier and a device-secret code are provided to the manufacturer or adapter 120 for provision to the device 130. In the particular example, the attestation identifier and a device-secret code are provided by the attestation generator 110. In certain examples, the device secret-code is the same as the base-secret code.

At step S240 the attestation identifier and device-secret code are provided by the manufacturer or adapter 120 to the device 130. In certain examples, the device-secret code is the same as the base-secret code and wherein in response to provision of the attestation identifier and the device-secret code to the device 130, the device 130 hashes the device-secret code using the first predetermined hash function to generate the validation-secret code. This first predetermined hash function is the same as that used to provide the validation-secret code to the validation apparatus 140 thus both the validation apparatus 140 and device 130 end up with a copy of the same validation-secret code without this code being distributed to both devices.

In certain examples, the device then further hashes the validation-secret code in combination with one or more items of locally available information using a second predetermined hash function to generate a hashed-value. The second predetermined hash function may be the same computational function (e.g. SHA-256) as that used for the first predetermined hash function but simply operating on different inputs.

In certain examples, the device 130 may use different locally available information depending on whether the attestation identifier and device-secret code it receives are the initial (i.e. first) such attestation identifier and device-secret code received or subsequently received attestation identifiers and device-secret codes. In a certain example, when the attestation identifier and device-secret code are the initial attestation identifier and initial device-secret code provided to the device 130 the one or more items of locally available information comprise a device identifier, and when the attestation identifier and device-secret code are not the initial attestation identifier and initial device-secret code provided to the device 130 the one or more items of locally stored information comprise a previous hashed-value. In other words, the second predetermined hash function is iteratively applied each time a new attestation identifier and device-secret code are received taking the previous hashed-value of a previous iteration of the second predetermined hash function. This can be thought of as making the final hashed-value a "digest" of at least some of the previous hashed-values and accordingly of their corresponding attestation identifiers and device-secret codes which went into generating these previous hashed-values. In some examples, the previous hashed-value is the previous hashed-value such that final hashed-value, through this iterative operation, acts as digest of all hashed-values generated on the device 130. In some examples, after generation of any given hashed-value the hashed-value is stored by the device 130 but the corresponding device-secret code and validation-secret code are discarded such that they are not stored on the device 130. Further, in some examples, only the very most recent hashed-value is stored with all previous hashed-values being discarded after the most recent hashed-value is generated. As previously described, as the most recent hashed-value can act as a digest of all previous hashed-values it is still possible to check the validity of all the previous hashed-values even though the hashed-values themselves have been discarded.

In certain examples, other items of data can be included as inputs to the hash functions to further enhance their security. For example, in certain examples the second predetermined hash function can additionally take as input the attestation identifier and/or metadata (e.g. information about the internal status of the device, an information payload, information received by the device from external sources). In some examples, the metadata may include some or all of the code present on the device and one or more public keys stored on the device. Additionally or alternatively, the metadata may include information related to the state of the device software (e.g. software name, version, hash/public key used to sign the software), time/date that the hashed-value was generated, the human/machine operation(s) involved, or the geographic location where the operation took(s) place. When these additionally inputs are used they can also be stored on the device 130 after the hashed-value has been generated.

It will be recognised that while the method steps have been depicted in a particular order it is explicitly contemplated that the steps can be carried out in any suitable order. For example, step S230 can be performed before step S220 and step S240 can be performed at any point after step S230 has been performed.

Figure 3:
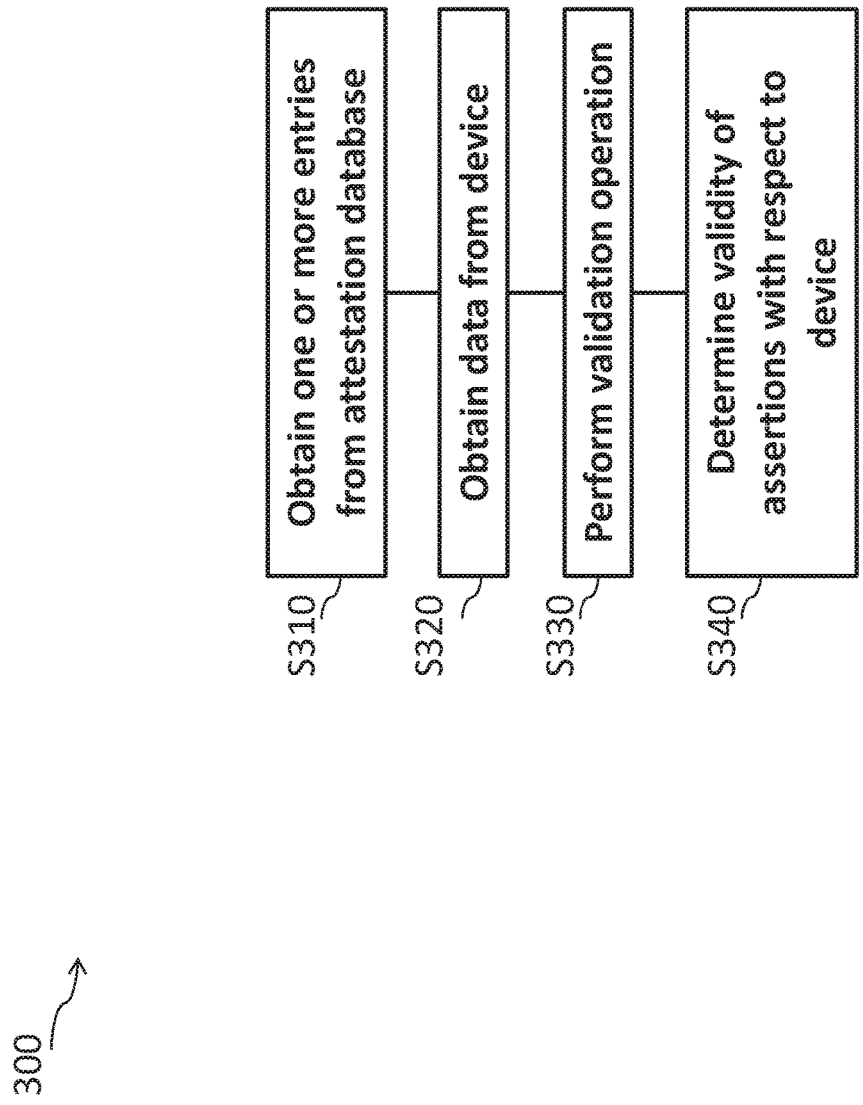
FIG. 3: Schematically illustrates a method for a validation apparatus to validate an attestation from a device attesting to an assertion concerning the device.

FIG. 3 shows a schematic illustration of a method 300 for the validation apparatus 140 to validate an attestation from a device 130 attesting to an assertion concerning the device 130 which comprises the following steps.

At step S310, the validation apparatus 140 obtains from the attestation database 150 one or more entries, each entry including an attestation identifier, a validation-secret code and an assertion. In certain examples, a plurality of validation-secret codes and assertions in association with a particular attestation identifier are obtained by the validation apparatus 140 from the attestation database 150. In other words, the attestation identifier may not uniquely identify a particular validation-secret code and assertion.

At step S320, the validation apparatus 140 obtains from the device 130 one or more attestation identifiers and a hashed-value. In certain examples, a device identifier and/or metadata is also obtained from the device. Additionally or alternatively, in some examples, a plurality of attestation identifiers are obtained from the device but only one hashed-value corresponding to the most recent hashed-value is obtained from the device 130. In other examples, a plurality of attestation identifiers are obtained from the device and a plurality of hashed-values are obtained from the device.

At step 330, the validation apparatus 140 preforms a validation operation on the one or more attestation identifiers obtained from the device 130 together with the corresponding validation-secret codes obtained from the attestation database 150 to validate the hashed-value obtained from the device 130. In certain examples, when the device identifier and/or metadata are also obtained from the device, the validation operation is further performed on the device identifier and/or metadata.

In certain examples, the validation operation includes at least one hash function per attestation identifier obtained from the device 130. Each hash function iteratively acts on the result of the previous hash function with each successive hash function taking as an input at least an attestation identifier not previously used as an input in the previous hash functions. In other words, for example, where the hashed-value received by the validation apparatus 140 was generated through iterative operations performed on the device 130 (i.e. where the sent hashed-value has been generated on the device 130 based in part on one or more previous hashed-values) the validation operation is able to iteratively act on this "digest" hashed-value to successively validate each "layer" of the received hashed-value and hence ultimately validate the entire chain of hashed-values.

In certain examples, where a plurality of attestation identifiers are obtained from the device and only one hashed-value corresponding to the most recent hashed-value is obtained from the device, the validation operation determines whether all or none of the plurality of assertions associated with the plurality of attestation identifiers obtained from the device are valid in respect of the device in dependence on the validation result by the validation operation.

In other examples, where a plurality of attestation identifiers are obtained from the device and a plurality of hashed-values are obtained from the device, the validation operation includes a plurality of individual validation operations whereby it is determined whether subsets of the plurality of assertions associated with the plurality of attestation identifiers obtained from the device are valid in dependence on the validation results of the plurality of validation operations.

In further examples, where the validation apparatus 140 obtains from the attestation database 150 a plurality of validation-secret codes and assertions in association with a particular attestation identifier, the validation operation is attempted in relation to the attestation identifier obtained from the device with each of the possible validation-secret codes. In other words, the validation operation is attempted for every possible validation-secret code associated with the non-unique attestation identifier.

At step 340, the validation apparatus 140 determines whether the one or more assertions associated with the one or more attestation identifiers obtained from the device 130 are valid in respect of the device 130 in dependence on a validation result of the validation operation.

It will be recognised that while the method steps have been depicted in a particular order it is explicitly contemplated that the steps can be carried out in any suitable order. For example, step S320 can be performed before step S310.

Figure 4:
FIG. 4: Schematically illustrates example information content of an attestation database.

FIG. 4 schematically illustrates example information content 400 of an attestation database 150. In the particular example depicted, five fields are shown: Attestation Identifier, Validation-Secret Code, Assertion, Additional Field 1 and Additional Field 2. Three example entries are shown. The first row has an Attestation Identifier of 1001, a Validation-Secret Code of AB47EF89 and an Assertion of Device Property 1 (e.g. has a security region 630 of data storage 620). The second row has an Attestation Identifier of 1002, a Validation-Secret Code of 749DABE6 and an Assertion of Event 1 (e.g. has had communications I/F 640 installed by specific manufacturer/adapter 120). The third row has an Attestation Identifier of 1003, a Validation-Secret Code of BF56DEF0 and an Assertion of Quality Assurance 1 (e.g. the integrity of an OS stored in data storage 620 has been verified).

In addition, each row has two Additional Fields, 1 and 2. These can contain any additional information desired, for example, the specific manufacturer/adapter that a particular attestation identifier has been assigned two or the number of times that a request to validate a particular assertion has been made. It is contemplated, that substantially any desired information could be stored in these fields. In some examples, the field(s) may include an identifier (e.g. the device identifier) of the device or devices where the attestation has previously been seen and wherein the field(s) are updated during the validation of the attestation.

As described above, this example information content 400 of an attestation database 150 is just one possible format. For example, the information content may have fewer or greater number of rows and columns. For example, the information content may have zero, one, three, four or five Additional Fields. The information content may have substantially any number of rows required. It is further explicitly recognised, that the particular format shown for the entries for the Attestation Identifier, Validation-Secret Code and Assertion are just one example format. For example, the Attestation Identifier and Validation-Secret Code could comprise a greater or fewer number of symbols and these symbols could, for example, be made up from decimal numerals, hexadecimal numerals or an ASCII character set.

Figure 5:
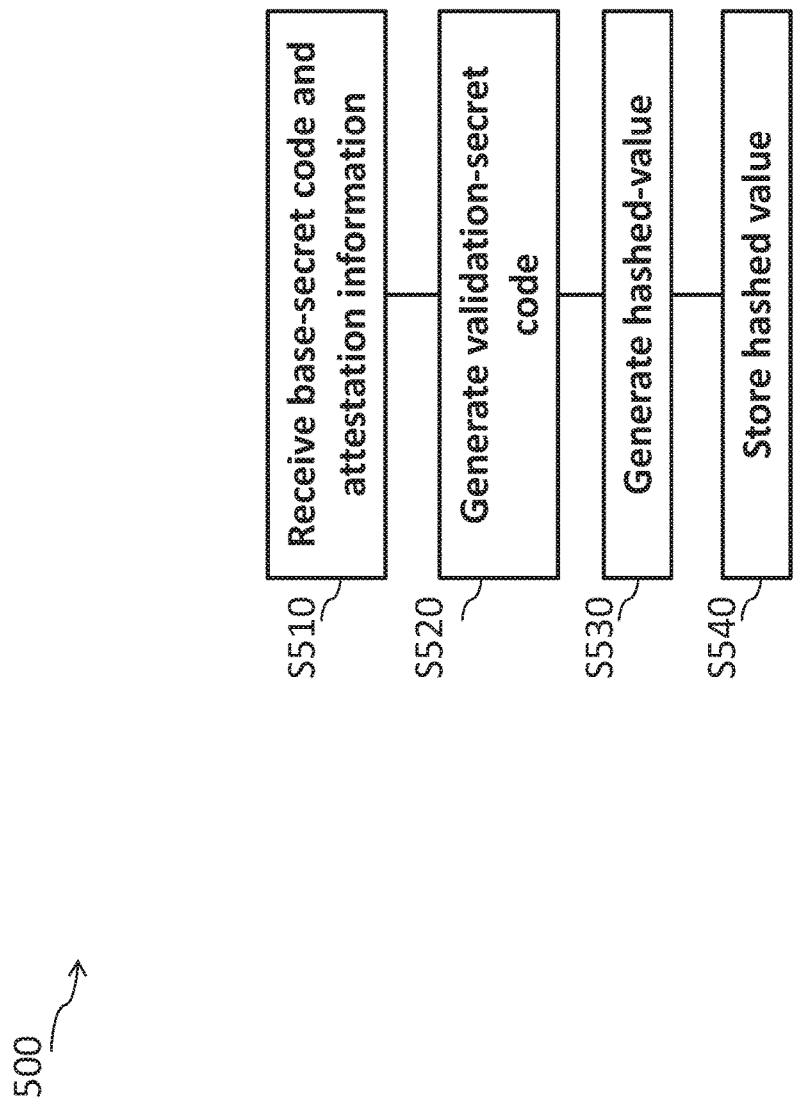
FIG. 5: Schematically illustrates a method for a device to store information on the device enabling the device to attest to an assertion concerning the device.

FIG. 5 shows a schematic illustration of a method 500 for a device 130 to store information on the device 130 enabling the device 130 to attest to an assertion concerning the device 130 which includes the following steps.

At step S510, a base-secret code and a corresponding attestation identifier is received at the device 130.

At step S520, the base-secret code is hashed at the device 130 using a first predetermined hash function to generate a validation-secret code.

At step S530, the validation-secret code is hashed at the device in combination with one or more items of locally available information using a second predetermined hash function to generate a hashed-value.

At step S540, the hashed-value is stored on the device 130.

FIG. 6 schematically illustrates an example of an electronic device 600. The device has processing circuitry 610 for performing data processing in response to program instructions, data storage 620 for storing data and instructions to be processed by the processing circuitry 610. The data storage 620 may have a secure region 630 which is protected by hardware mechanisms (e.g. using memory protection units or security mechanisms providing a trusted execution environment) or by software mechanisms (e.g. encryption), so that data stored in a secure region 630 is inaccessible to software not executing within a trusted environment. The device 600 has a communications interface 640 for communicating with external devices. For example communications interface 640 could use any other range of different communication protocols, such as Ethernet, WiFi®, Bluetooth®, ZigBee®, etc. The device may have one or more sensors 650 for sensing certain external conditions such as temperature, pressure, the proximity of a nearby user, etc. The specific sensors 650 provided may depend on the purpose of the device. It will be appreciated that FIG. 6 is merely an example of possible hardware that may be provided in the device and other components may also be provided. For example, some devices for which user interaction is expected may be provided with a display and/or a user interface module in order to display information to the user and receive input from the user. Other types of devices may simply be sensors which capture data and transmit the data to an external device and so these types of devices may not need a user interface or display. It will be appreciated that the processing circuitry may be more powerful and the data storage may be greater for electronic devices 600 when implementing any of an attestation generator 110, manufacturer/adapter 120, validation apparatus 140 or attestation database 150 than when implementing a device 130.

The methods discussed above may be performed under control of a computer program executing on an apparatus. Hence a computer program may comprise instructions for controlling an apparatus to perform any of the methods discussed above (including methods performed on any of the attestation generator 110, manufacturer/adapter 120, device 130, validation apparatus 140 and the attestation database 150. The program can be stored on a storage medium. The storage medium may be a non-transitory recording medium or a transitory signal medium.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative teachings of the disclosure have been described in detail herein with reference to the accompanying drawings, it is to be understood that the invention is not limited to those precise teachings, and that various changes and modifications can be effected therein by one skilled in the art without departing from the scope and spirit of the invention as defined by the appended claims.

Further examples of feature combinations taught by the present disclosure are set out in the following numbered clauses:

1. A method for providing an attestation for enabling a device to attest to an assertion concerning the device, comprising:
generating an attestation identifier and a base-secret code corresponding to the attestation identifier;
providing the attestation identifier and a validation-secret code to a validation apparatus for storage in conjunction with the assertion,
wherein the validation-secret code is based on the base-secret code; providing the attestation identifier and a device-secret code to a manufacturer or adapter for provision to a device,
wherein the device-secret code is based on the base-secret code.

2. The method of clause 1, wherein the attestation identifier and the device-secret code are provided by the manufacturer or adapter to the device.

3. The method of clause 1 or clause 2, wherein the device-secret code is the same as the base-secret code.

4. The method of any preceding clause, wherein the base-secret code is not provided to the validation apparatus.

5. The method of any preceding clause, wherein the validation-secret code is generated by hashing the base-secret code using a first predetermined hash function.

6. The method of clause 5, wherein the device-secret code is the same as the base-secret code, and wherein in response to provision of the attestation identifier and the device-secret code to the device, the device hashes the device-secret code using the first predetermined hash function to generate the validation-secret code.

7. The method of clause 6, wherein the device further hashes the validation-secret code in combination with one or more items of locally available information using a second predetermined hash function to generate a hashed-value.

8. The method of clause 7, wherein the first predetermined hash function and second predetermined hash function use the same computational function but operate on different data inputs.

9. The method of clause 7 or clause 8, wherein when the attestation identifier and device-secret code are the initial attestation identifier and the initial device-secret code provided to the device the one or more items of locally available information comprise a device identifier, and
wherein when the attestation identifier and device-secret code are not the initial attestation identifier and the initial device-secret code provided to the device the one or more items of locally stored information comprise a previous hashed-value.

10. The method of clause 9, wherein the previous hashed-value is the most recent previous hashed value.

11. The method of clause 9 or clause 10, wherein after generation of the hashed-value the device stores the hashed-value but does not store the device-secret code or validation-secret code.

12. The method of clause 11, wherein the device only stores the most recent hashed-value.

13. The method of any of clauses 7 to 12, wherein the device further hashes the validation-secret code in combination with the attestation identifier to generate the hashed-value.

14. The method of clause 13, wherein after generation of the hashed-value the device stores the attestation identifier.

15. The method of any of clauses 7 to 14, wherein the one or more items of locally available information further comprise metadata.

16. The method of clause 15, wherein after generation of the hashed-value the device stores the metadata.

17. A method for a validation apparatus to validate an attestation from a device attesting to an assertion concerning the device, comprising:
obtaining from an attestation database one or more entries, each entry comprising an attestation identifier, a validation-secret code and an assertion;
obtaining from the device one or more attestation identifiers and a hashed-value;
performing a validation operation on the one or more attestation identifiers obtained from the device together with the corresponding validation-secret codes obtained from the attestation database to validate the hashed-value obtained from the device;
determining whether the one or more assertions associated with the one or more attestation identifiers obtained from the device are valid in respect of the device in dependence on a validation result of the validation operation.

18. The method of clause 17, wherein a device identifier is further obtained from the device, and wherein the validation operation is further performed on the device identifier.

19. The method of clause 17 or clause 18, wherein metadata is further obtained from the device, and wherein the validation operation is further performed on the metadata.

20. The method of any of clauses 17 to 19, wherein the validation operation comprises at least one hash function per attestation identifier obtained from the device and wherein each hash function iteratively acts on the result of the previous hash function with each successive hash function taking as an input at least an attestation identifier not previously used as an input in the previous hash functions.

21. The method of any of clauses 17 to 20, wherein a plurality of attestation identifiers are obtained from the device and only one hashed-value corresponding to the most recent hashed-value is obtained from the device, and wherein it is determined whether all or none of the plurality of assertions associated with the plurality of attestation identifiers obtained from the device are valid in respect of the device in dependence on the validation result by the validation operation.

22. The method of any of clauses 17 to 20, wherein a plurality of attestation identifiers are obtained from the device and a plurality of hashed-values are obtained from the device, and wherein the validation operation comprises a plurality of validation operations whereby it is determined whether subsets of the plurality of assertions associated with the plurality of attestation identifiers obtained from the device are valid in dependence on the validation results of the plurality of validation operations.

23. The method of any of clauses 17 to 22, wherein the validation apparatus obtains from the attestation database a plurality of validation-secret codes and assertions in association with a particular attestation identifier, and wherein when the particular attestation identifier is obtained from the device the validation operation is attempted with each of the possible validation-secret codes.

24. A method for a device to store information on the device enabling the device to attest to an assertion concerning the device, comprising:

receiving, at the device, a base-secret code and a corresponding attestation identifier;

hashing, at the device and using a first predetermined hash function, the base-secret code to generate a validation-secret code;

hashing, at the device and using a second predetermined hash function, the validation-secret code in combination with one or more items of locally available information using a second predetermined hash function to generate a hashed-value, wherein after generation of the hashed-value the device stores the hashed-value.

25. A computer program for controlling a device to perform the method of any of clauses 1 to 24.

26. A storage medium storing the computer program of clause 25.

27. An apparatus comprising:

processing circuitry to perform data processing; and data storage storing a computer program for controlling the processing circuitry to perform the method of any of clauses 1 to 24.

The invention claimed is:

1. A method for providing an attestation for enabling a device to attest to an assertion concerning the device, comprising:

generating an attestation identifier and a base-secret code corresponding to the attestation identifier;

providing the attestation identifier and a validation-secret code to a validation apparatus for storage in conjunction with the assertion, wherein the validation-secret code is based on the base-secret code;

providing the attestation identifier and a device-secret code to a manufacturer or adapter for provision to the device, wherein the device-secret code is based on the base-secret code, the validation-secret code is generated by hashing the base-secret code using a first predetermined hash function, the device-secret code is the same as the base-secret code, in response to provision of the attestation identifier and the device-secret code to the device, the device hashes the device-secret code using the first predetermined hash function to generate the validation-secret code, and the device further hashes the validation-secret code in combination with one or more items of locally available information using a second predetermined hash function to generate a hashed-value.

2. The method of claim 1, wherein the base-secret code is not provided to the validation apparatus.

3. The method of claim 1, wherein when the attestation identifier and device-secret code are the initial attestation identifier and the initial device-secret code provided to the device the one or more items of locally available information comprise a device identifier, and wherein when the attestation identifier and device-secret code are not the initial attestation identifier and the initial device-secret code provided to the device the one or more items of locally stored information comprise a previous hashed-value.

4. The method of claim 3, wherein the previous hashed-value is the most recent previous hashed value.

5. The method of claim 3, wherein after generation of the hashed-value the device stores the hashed-value but does not store the device-secret code or validation-secret code, or wherein the device only stores the most recent hashed-value.

6. The method of claim 1, wherein the device further hashes the validation-secret code in combination with the attestation identifier to generate the hashed-value, or wherein after generation of the hashed-value the device stores the attestation identifier.

7. The method of claim 1, wherein the one or more items of locally available information further comprise metadata, or wherein after generation of the hashed-value the device stores the metadata.

8. A method for a validation apparatus to validate an attestation from a device attesting to an assertion concerning the device, comprising:

obtaining from an attestation database one or more entries, each entry comprising an attestation identifier, a validation-secret code and an assertion;

obtaining from the device one or more attestation identifiers and a hashed-value;

wherein prior to the obtaining from the device, the device has generated one or more validation-secret codes, each validation-secret code has been generated by the device by hashing a device-secret code using a first predetermined hash function, and wherein the hashed-value has been generated by the device hashing the one or more validation-secret codes in combination with one or more items of information locally available on the device using a second predetermined hash function;

performing a validation operation on the one or more attestation identifiers obtained from the device together with the corresponding validation-secret codes obtained from the attestation database to validate the hashed-value obtained from the device;

determining whether the one or more assertions associated with the one or more attestation identifiers obtained from the device are valid in respect of the device in dependence on a validation result of the validation operation.

9. The method of claim 8, wherein a device identifier and/or metadata is further obtained from the device, and wherein the validation operation is further performed on the device identifier and/or on the metadata.

10. The method of any claim 8, wherein the validation operation comprises at least one hash function per attestation identifier obtained from the device and wherein each hash function iteratively acts on the result of the previous hash function with each successive hash function taking as an input at least an attestation identifier not previously used as an input in the previous hash functions.

11. The method of claim 8,
wherein a plurality of attestation identifiers are obtained from the device and only one hashed-value corresponding to the most recent hashed-value is obtained from the device, and
wherein it is determined whether all or none of the plurality of assertions associated with the plurality of attestation identifiers obtained from the device are valid in respect of the device in dependence on the validation result by the validation operation.

12. The method of claim 8,
wherein a plurality of attestation identifiers are obtained from the device and a plurality of hashed-values are obtained from the device, and
wherein the validation operation comprises a plurality of validation operations whereby it is determined whether subsets of the plurality of assertions associated with the plurality of attestation identifiers obtained from the device are valid in dependence on the validation results of the plurality of validation operations.

13. The method of claim 8,
wherein the validation apparatus obtains from the attestation database a plurality of validation-secret codes and assertions in association with a particular attestation identifier, and
wherein when the particular attestation identifier is obtained from the device the validation operation is attempted with each of the possible validation-secret codes.

14. A plurality of non-transitory, computer-readable storage media each storing a computer program, which when executed by one or more computers, controls the one or more computers to:
generate an attestation identifier and a base-secret code corresponding to the attestation identifier;
provide the attestation identifier and a validation-secret code to a validation apparatus for storage in conjunction with the assertion,
wherein the validation-secret code is based on the base-secret code;
provide the attestation identifier and a device-secret code to a manufacturer or adapter for provision to the device, wherein:
the device-secret code is based on the base-secret code,
the validation-secret code is generated by hashing the base-secret code using a first predetermined hash function,
the device-secret code is the same as the base-secret code,
in response to provision of the attestation identifier and the device-secret code to the device, the device-secret code is hashed using the first predetermined hash function to generate the validation-secret code, and
the validation-secret code is further hashed in combination with one or more items of locally available information using a second predetermined hash function to generate a hashed-value.

15. A system comprising:
processing circuitry to perform data processing; and
data storage storing one or more computer programs, which when executed by the processing circuitry, controls the processing circuitry to:
generate an attestation identifier and a base-secret code corresponding to the attestation identifier;
provide the attestation identifier and a validation-secret code to a validation apparatus for storage in conjunction with the assertion,
wherein the validation-secret code is based on the base-secret code;
provide the attestation identifier and a device-secret code to a manufacturer or adapter for provision to a device,
wherein the device-secret code is based on the base-secret code,
wherein the validation-secret code is configured to be generated by hashing the base-secret code using a first predetermined hash function,
wherein the device-secret code is the same as the base-secret code,
in response to provision of the attestation identifier and the device-secret code to the device, hash the device-secret code using the first predetermined hash function to generate the validation-secret code, and
further hash the validation-secret code in combination with one or more items of locally available information using a second predetermined hash function to generate a hashed-value.

* * * * *